US008014674B2

(12) United States Patent
Gao et al.

(10) Patent No.: US 8,014,674 B2
(45) Date of Patent: Sep. 6, 2011

(54) METHOD FOR OPERATING PON USER TERMINAL AND A PON USER TERMINAL

(75) Inventors: Hai Gao, Shenzhen (CN); Yong He, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 807 days.

(21) Appl. No.: 12/052,531

(22) Filed: Mar. 20, 2008

(65) Prior Publication Data

US 2008/0212964 A1 Sep. 4, 2008

Related U.S. Application Data

(63) Continuation of application No. PCT/CN2006/002485, filed on Sep. 22, 2006.

(30) Foreign Application Priority Data

Sep. 23, 2005 (CN) .......................... 2005 1 0037421

(51) Int. Cl.
*H04B 10/00* (2006.01)
(52) U.S. Cl. ............................... 398/72; 398/70; 398/67
(58) Field of Classification Search .............. 398/66–72
See application file for complete search history.

(56) References Cited

U.S. PATENT DOCUMENTS

| | | | | |
|---|---|---|---|---|
| 5,504,606 A * | 4/1996 | Frigo | .............................. | 398/58 |
| 6,473,608 B1 | 10/2002 | Lehr et al. | | |
| 6,504,630 B1 | 1/2003 | Czarnocha et al. | | |
| 6,690,655 B1 * | 2/2004 | Miner et al. | ................... | 370/278 |
| 6,778,550 B1 * | 8/2004 | Blahut | ........................... | 370/443 |
| 6,785,564 B1 * | 8/2004 | Quigley et al. | ............... | 455/574 |
| 7,139,829 B2 * | 11/2006 | Wenzel et al. | ................ | 709/232 |
| 7,287,175 B2 * | 10/2007 | Vereen et al. | ................ | 713/323 |
| 7,389,528 B1 * | 6/2008 | Beser | ............................ | 725/111 |
| 7,545,813 B2 * | 6/2009 | Davis et al. | ................ | 370/395.4 |
| 7,751,711 B2 * | 7/2010 | Wynman | ......................... | 398/72 |
| 2006/0029389 A1 * | 2/2006 | Cleary et al. | .................... | 398/33 |
| 2006/0093356 A1 * | 5/2006 | Vereen et al. | .................... | 398/33 |
| 2008/0195881 A1 * | 8/2008 | Bernard et al. | ............... | 713/340 |
| 2009/0263127 A1 * | 10/2009 | Haran et al. | .................... | 398/38 |

FOREIGN PATENT DOCUMENTS

| | | |
|---|---|---|
| EP | 1 006 682 A2 | 6/2000 |
| JP | 11-317759 A | 11/1999 |
| JP | 2000-324101 A | 11/2000 |
| WO | 2006/023015 A1 | 3/2006 |

* cited by examiner

*Primary Examiner* — Agustin Bello
(74) *Attorney, Agent, or Firm* — Leydig, Voit & Mayer, Ltd.

(57) ABSTRACT

A method for operating PON (passive optical network) user terminal and a PON user terminal equipment, when there is only few data service request in the PON, the PON user terminal operates in power saving manner which maintains low speed connection, the method comprises: a judgment condition that the PON user terminal changes to power saving state is set; the PON user terminal determines whether its own state meet the judgment condition changing to power saving state, if so, it transmits a request to change to power saving state to the OLT (optical line terminal); after the PON user terminal receives the respond that the OLT has accepted the request, it controls parts of the modules therein to change to power saving state, and intermittently switch over between power saving state and normal state. The invention allows saving power under the condition that keeps the low speed service uninterrupted, in the meanwhile alleviates the pressure of ONU terminal thermal design.

12 Claims, 5 Drawing Sheets

Figure 3

METHOD FOR OPERATING PON USER TERMINAL AND A PON USER TERMINAL

CROSS-REFERENCE TO RELATED APPLICATIONS

The present application is a continuation application of PCT application No. PCT/CN2006/002485, filed Sep. 22, 2006, which claims Chinese priority No. 200510037421.2, filed Sep. 23, 2005, both of which are hereby incorporated by reference in their entirety.

FIELD OF THE INVENTION

The present invention relates to the technical field of passive optical network, and particularly to a method for operating a passive optical network user terminal and a passive optical network user terminal.

BACKGROUND OF THE INVENTION

In the broadband access network with a larger and larger scale, most of existing Local Area Networks (LANs) operate on a network of 100 Mbit/s, and many large-scale commercial companies are transiting to Gigabit Ethernet (GE). However, on the metropolitan area core network and the metropolitan area edge network, Synchronous Optical Network (SONET)/Synchronous Digital Hierarchy (SDH)/Gigabit Ethernet (GE) each have sufficient bandwidth capacity, which results in a serious bandwidth bottle at the access network part. Compared with cable transmission, optical fiber transmission has advantages including large capacity, small loss and strong Anti-electro-magnetic interference capability. Therefore, with the decreased cost of optical fiber transmission, the utilization of optical fiber is an inevitable trend. The access network segment representing "the last mile" part has requirements such as very low cost, simple structure and convenient implementation, which challenges the technical implementation. Passive devices are adopted in the Passive Optical Network (PON), which is the most potential technique to implement the broadband optical access network.

By the content that is born, the PON technique is classified into ATM Based PONs (APON), Ethernet Based PONs (EPON) and Gigabit PONs (GPON).

The broadband access technique for the Passive Optical Network (PON) has the following advantages:

In the passive optical network, there is no active device between the central office and the customer premise network. Alternatively, passive optical devices are inserted in the network, and transmitted flows are led by separating the power of optical wavelength throughout the path. With this alternation, service providers do not need to supply power to active devices and maintain the active devices in the transmission loop, which saves cost for the service providers greatly. The passive optical splitter and coupler only serve to transfer and restrict the light without the need of power supply and information processing, and have an unlimited Mean Time Between Failure (MTBF) which can reduce the maintenance cost for the service providers completely.

As illustrated in FIG. 1, the passive optical network usually includes an Optical Line Terminal (OLT) located in the Central Office (CO) and a series of Optical Network Units (ONUs) located in the customer premise. Between these devices, there is an Optical Distribution Network (ODN) consisting of optical fibers, and passive optical splitters or couplers. In a PON, a single optical fiber may be led from a serving switching office to a bandwidth service sub-area or an office area, and then the main optical fiber is split into several branches to respective buildings or service devices by using a passive optical splitter or coupler. In this manner, multiple users can share the relative expensive optical fiber link which is from the switching office to the customer premise, and the cost of Fiber To The Building (FTTB) and Fiber To The Home (FTTH) is therefore reduced greatly.

With the techniques of APON, Broadband Passive Optical Network (BPON), EPON or GPON to be standardized, the speed of 155 Mbit/s, 622 Mbit/s, 1.25 Gbit/s, or 2.25 Gbit/s can be provided on backbone optical fibers of the PON. To support voice, data and video applications concurrently, the bandwidth for each user may be configured statically, or the bandwidth for each user may be configured dynamically.

The principle of data transmission in the PON is as follows:

In accordance with the PON technique, Time Division Multiple Access (TDMA) technique is used in the upstream link path, and the office-end device OLT performs time window authorization for the respective ONUs in the network, i.e. authorizes different ONUs to send upstream data during different time periods, so that the upstream data from the different ONUs may not conflict. Therefore, the optical module device in each ONU terminal is controlled by PON protocol, to open and close the sending function of the optical module intermittently (i.e. so-called "burst" sending). The receiving function of the optical module of the ONU terminal keeps in an open state, so that the ONU can receive time window authorization information from the OLT.

Usually, message frames of time window authorization sent from the OLT to each ONU each include two kinds of information: starting time at which the ONU is allowed to open the optical module for sending, and duration time in which the ONU opens the optical module for sending. The OLT allocates an authorized time window for each ONU dynamically in accordance with bandwidth requirements of each ONU, so that use bandwidth of each ONU can change dynamically and complies with a preset bandwidth policy. The calculation and scheduling process is called Dynamic Bandwidth Allocation (DBA) algorithm. The OLT can set a mode in which an ONU obtains an authorized time window through the DBA algorithm, e.g. periodical cycle mode. When an ONU registers with the PON, the OLT performs time synchronization with the ONU, so that the two parties recognize a common time.

The ONU supports multiple services and some of the services are activated in a low-speed connection state for a long time with a small bandwidth occupied (e.g. the Keep Alive mechanism of terminals and the office end in VoIP service). At present, ONU terminals are kept in an operating state for a long time, energy consumed during the operation is fixed, and power consumption can not be adjusted automatically. The energy is wasted greatly when services requiring low power consumption are activated for a long time.

The energy consumption includes three aspects: office-end device, terminal devices, and attenuation consumption of in-between ODN. Consumption of office end and terminals is large, which is caused by operation of devices. Consumption of the in-between ODN is small, which is caused by attenuation of laser in optical fibers.

Because the PON system is proposed for a short time and actual PON devices are not applied to operate, there is no relevant energy saving technique of PON terminals at present.

SUMMARY OF THE INVENTION

Technical problems solved by the present invention are: to overcome the problem that energy consumption can not be adjusted automatically in the existing passive optical network, and to reduce energy consumption when only services requiring low power consumption is active for a long time. A method for operating a user terminal in a passive optical network according to the present invention makes the user terminal in the passive optical network adjust energy consumption automatically, so as to save energy.

A method for operating a passive optical network user terminal, including:

Configuring a determining condition for entering into a saving state for the passive optical network user terminal;

Detecting if the state of the passive optical network user terminal matches the determining condition for entering into a saving state, and sending a request for entering into a saving state to an optical line terminal if the determining condition is matched, by the passive optical network user terminal; and On receiving a response accepting the request from the optical line terminal, controlling part of internal modules to enter into a saving state and switching between the saving state and a normal state intermittently, by the passive optical network user terminal.

The following method technical solutions are optional technical solutions.

The determining condition for entering into a saving state is a traffic threshold or an activity indication of a service port; and the determining the determining condition is matched includes:

detecting the service traffic periodically, and performing determination of entering into a saving state in accordance with the traffic threshold and the detected service traffic, by the passive optical network user terminal; or performing interrupt triggering in accordance with the activity indication of service port of a passive optical network, by the passive optical network user terminal.

The passive optical network user terminal sends a request message for entering into a save state to the optical line terminal, the request message including saving state parameters; the optical line terminal sets a dynamic bandwidth allocation policy for the passive optical network user terminal in accordance with the saving state parameters if the optical line terminal accepts the request, so that an authorized time window allocated to the passive optical network user terminal is in a normal state time period; the passive optical network user terminal does not enter into the saving state if the optical line terminal does not accept the request or does not respond to the request.

The saving state parameters comprise a saving state operating time and a normal state operating time, the passive optical network user terminal wakes up and sleeps periodically in accordance with the operating time; in the normal state the passive optical network user terminal operates normally, and data with low-speed service connection is transmitted between the passive optical network user terminal and the optical line terminal; in a sleep state the power consumption of a part of modules of the passive optical network user terminal is stopped or reduced, and sends no data to the optical line terminal.

A low-power consumption mode of a central processing module in the passive optical network user terminal is utilized to make the central processing module enter into a part-sleep state.

A self-saving function of the modules in the passive optical network user terminal is utilized to make the modules enter into a saving state; or relevant modules in the passive optical network user terminal are provided with a power switch respectively, so that the central processing module in the passive optical network user terminal controls corresponding modules to switch between the normal state and the saving state by controlling the closing and opening of the power switches.

An optical module and a passive optical network protocol processing module are controlled to be in a saving state, so that the passive optical network user terminal in the saving state is not able to transmit upstream and downstream data, to save power consumption of the optical module and the passive optical network protocol processing module; or the optical module and part of the passive optical network protocol processing module are controlled to be in a saving state, so that the passive optical network user terminal in the saving state can receive downstream data messages from the optical line terminal.

The passive optical network user terminal in the saving state detects the state of the passive optical network user terminal; if the passive optical network user terminal detects that the state of the passive optical network user terminal does not match the determining condition for saving power, the passive optical network user terminal quits the saving state and resumes a normal working state.

The passive optical network user terminal in the saving state receives information from the optical line terminal; if the passive optical network user terminal receives information for instructing to quit the saving state, the passive optical network user terminal quits the saving state and resumes a normal working state.

If the passive optical network user terminal in the saving state is to quit the saving state, the passive optical network user terminal sends a request message for quitting the saving state to the optical line terminal, to request a bandwidth for resumed normal operation.

The present invention also provides a passive optical network user terminal device, wherein the passive optical network user terminal device is provided with a detection and determination module, a communication module, and a control module;

the detection and determination module is configured to detect the state of the passive optical network user terminal, and to determine whether the detected state matches a determining condition for entering into a saving state, and to notify the communication module if the detection and determination module determines that the detected state matches the determining condition;

the communication module is configured to send a request for entering into a saving state to an optical line terminal upon being notified; and the control module is configured to control part of modules in the passive optical network user terminal to enter into the saving state after the passive optical network user terminal receives a response accepting the request from the optical line terminal.

An advantage of the present invention lies in that: the present invention provides a method for operating a passive optical network user terminal and a passive optical network user terminal, which save power consumption of passive optical network user terminal devices which services requiring low-bandwidth (e.g. voice) are active for a long time; in the present invention, a saving state is defined for each passive optical network user terminal device and a condition of state transition is provided, the passive optical network user terminal devices therefore have the capability of dynamically adjusting power consumption in accordance with the service bandwidth, e.g. a passive optical network user terminal enters into the saving state if only low-speed connection or unidirectional connection is need, which reduces power consumption; if a user service requires a large bandwidth, the ONU terminal enters into a normal state and power consumption resumes to be normal.

The present invention considers the energy saving of terminal devices. Because of the large number and wide coverage of the terminal devices, a great saving effect can be achieved. Further, when the terminal devices are configured with backup batteries or the alternating current network is powered off, the saving solution of the present invention can support services for a long time. The passive optical network user terminals should be in an on state for 24 hours because of such reasons as being in wall or being attached to telephones. If energy is not saved, energy consumption is great. It is assumed that a terminal operates at a power of 15-30 W for 24 hours, a remarkable saving effect is achieved if half of the energy is saved. According to the present invention, energy consumption is saved and the pressure of heat designing of the passive optical network user terminals is reduced in the case that low-speed services are maintained.

BRIEF DESCRIPTION OF THE DRAWINGS

FIG. 3 is a diagram illustrating an operating time layout in a normal state.

DETAILED DESCRIPTION OF THE INVENTION

Figure 1:
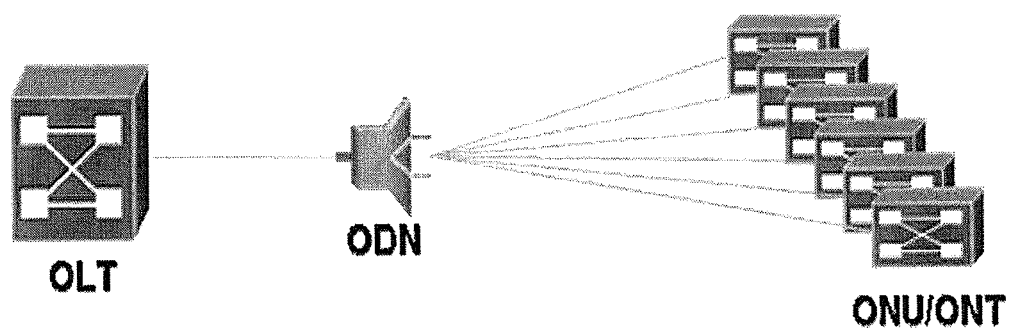
FIG. 1 is a diagram illustrating a structure of a PON.

The present invention is described in further detail with reference to the attached drawings and embodiments as follows.

The present invention provides a power saving solution for PON user terminal devices, so as to save power consumption of passive optical network user terminal devices when PON user terminal devices operate for services requiring only a low bandwidth (e.g. voice) for a long time. In the present invention, a power saving state is defined and a condition of state transition is provided for passive optical network user terminal devices.

If there are a few data service requests in the passive optical network system, passive optical network user terminals (i.e. ONUs) operate in a power saving manner with a low-speed connection. A method according to the present invention includes the steps as follows.

1. it is configured a determining condition under which a passive optical network user terminal may enter into a saving state.

2. the passive optical network user terminal detects if the state of itself matches the determining condition for entering into a saving state, and sends a request for entering into a saving state to an optical line terminal if it is determined that the determining condition for entering into a saving state is matched.

3. if the passive optical network user terminal receives a response accepting the request from the optical line terminal, the passive optical network user terminal controls part of its internal modules to enter into the saving state and switches between the saving state and a normal state intermittently.

4. if the passive optical network user terminal receives no response accepting the request from the optical line terminal or receives a response rejecting the request for entering into a saving state from the optical line terminal, the passive optical network user terminal does not enter into the saving state and operates normally.

When a passive optical network user terminal is designed, respective modules in the passive optical network user terminal are provided with a control switch respectively, via which working states of the respective modules can be controlled. If the passive optical network user terminal device detects that it is unnecessary to activate a large amount of services, the terminal device enters into a saving state, i.e. the respective modules except necessary modules (e.g. module for supervising data streams) in the passive optical network user terminal device enter into a periodical wake-up and sleep state, i.e. into a saving state.

The determining condition for entering into a saving state may be indicated by a traffic threshold or an activity indication of a service port. The passive optical network user terminal periodically detects if the determining condition for entering into a saving state is matched or is interrupt triggered in accordance with an activity indication of the passive optical network user terminal, so as to detect if the state of itself matches the determining condition for entering into a saving state in a real time manner. The passive optical network user terminal may perform detection by using an existing traffic counter of a service processing component or an activity indication of a service port, e.g. there are a traffic counting and service data type statistics in a data switching chip, a telephone interface module may detect if a user performs an off-hook, and a CATV interface module can detect if a television is turned on. The determining condition for entering into a saving state may be configured in a CPU software of the passive optical network user terminal, e.g. configure states of respective service interfaces (whether an off-hook is performed) or a traffic threshold of a data port (e.g. Ethernet port) in the CPU software. If a detected state matches the preset determining condition, the passive optical network user terminal initiates a process of entering into a saving state. The determining condition for entering into a saving state may be built in software of the terminal device, or may be sent to the passive optical network user terminal by an office-end administrator, or may be configured by a user of the terminal device itself. The determining condition in the passive optical network user terminal may be modified.

The passive optical network user terminal may detect its state via a periodical query mechanism or an interrupt triggered mechanism. In accordance with the periodical query mechanism, a time is set to perform detection periodically. In accordance with the interrupt triggered mechanism, an interrupt is generated by e.g. detecting by a telephone interface module if a user performs an off-hook and detecting by a CATV interface module if a television is turned on, to notify the CPU to process, so that real time detection is performed.

Figure 2:
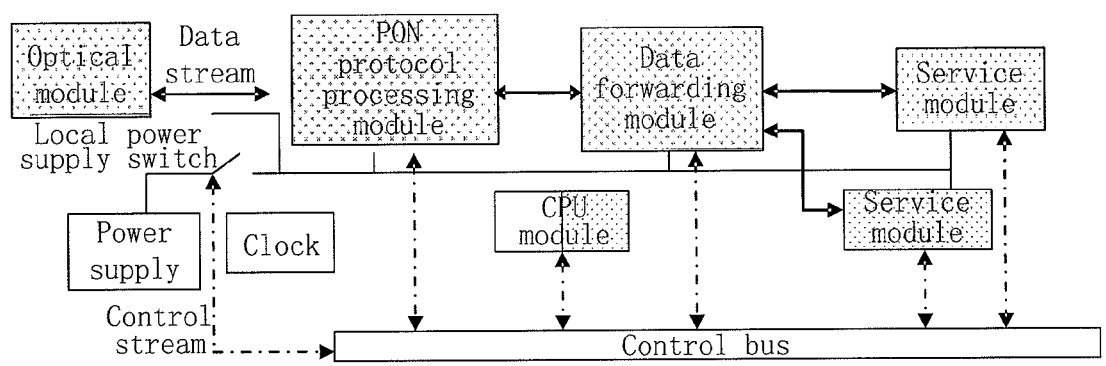
FIG. 2 is a diagram illustrating a logic structure of a passive optical network user terminal according to an embodiment of the present invention.

The technical solution of the present invention is described by taking a particular passive optical network user terminal as example with reference to FIG. 2.

FIG. 2 briefly illustrates a modular structure of a passive optical network user terminal. The passive optical network user terminal in FIG. 2 includes modules capable of completely entering into a sleep state, modules not capable of entering into a sleep state, and a module capable of entering into a half-sleep state. In FIG. 2, solid arrows represent data streams, dotted arrows represent control streams, blank blocks represent the modules not capable of sleeping, e.g. power supply and clock modules; complete shadowed blocks represent the modules capable of sleeping, e.g. optical module, PON protocol processing module, data forwarding module, and service module; and a half blank and half shadowed block represents the module capable of entering into half-sleep, i.e. certain functions of the module shall be reserved when the module enters into a sleep state, e.g. CPU module. When the modules capable of entering into sleep are designed to enter into a sleep control during a particular design, the existing saving function of relevant modules (some chips may enter into a low-power consumption mode under the control of a pin or a register) may be used, or a power switch is designed (the power switch may be silicon controlled or state relay, etc). The CPU controls the power switch through software, i.e. turns off the power supplies of the modules capable of sleeping if the power switch is open, so as to reduce power consumption of the passive optical network user terminal.

The CPU in the passive optical network user terminal may enter into a half-sleep state. Most of general CPUs (PowerPC, Intel IA32, ARM, MIPS, etc) provide a low-power consumption mode. A CPU can actively enter into many modes that are set such as Snap and Sleep. In these modes, part functions of the CPU can be still maintained; however, power consumption of the CPU is reduced greatly. The CPU may quit these low-power consumption modes to resume the normal state via a built-in timer or an external terminal.

The CPU obtains state information of respective service modules via control bus in FIG. 2, so that determination of saving condition can be performed. Further, the CPU controls low-power consumption modes of the respective service modules or controls the service modules to enter into a closing mode by controlling the power switch via the control bus. The CPU in the saving state maintains only interrupt and supervision thread operated, and carries the minimum service state monitoring work.

The procedure of a passive optical network user terminal entering into a saving state is described as follows.

1. it is detected that state of each service module matches a determining condition for entering into a saving sate.

Figure 4:
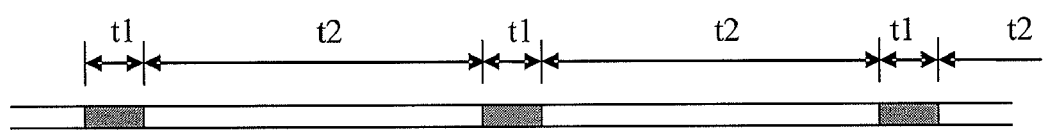
FIG. 4 is a diagram illustrating an operating time layout in a saving state according to an embodiment of the present invention.

2. a CPU sends a message to an office-end OLT via a PON interface, to request entering into a saving state, and negotiates with the office-end OLT periodical connection parameters (normal operating time t1, time t2 for sleeping or closing of part of modules, etc., as illustrated in FIG. 4), self-saving mode (e.g. two optional operating solutions in the saving mode as described as follows), etc.

3. the office-end OLT, on receiving the request message for entering into a saving state from the passive optical network user terminal, sets a DBA policy for the passive optical network user terminal in accordance with the periodical connection parameters and the self-saving mode, etc., so that an authorized time window allocated to the passive optical network user terminal is during the normal state time period t1. The office-end OLT sends to the passive optical network user terminal a response message indicating acceptance or rejection of the request.

4. the passive optical network user terminal, on receiving a response message indicating acceptance of the request from the office-end OLT, enters into the saving state, and switches between the sleep state (i.e. the saving state) and a normal state intermittently.

Figure 3:
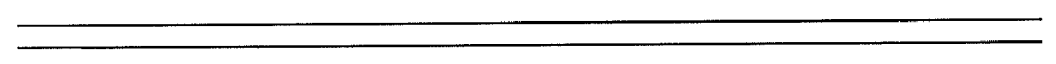

An operating time layout of a passive optical network user terminal in a normal state is illustrated in FIG. 3. An operating time layout of a passive optical network user terminal in a saving state according to the present invention is illustrated in FIG. 4. As can be seen from FIGS. 3 and 4, in the normal state, the passive optical network user terminal operates without any sleep, and maintains in a full power operating state, which results in energy consumption in the case of little data traffic. The passive optical network user terminal according to the present invention reduces energy consumption and saves energy by switching between the sleep state (i.e. the saving state) and the normal state intermittently.

Figure 5:
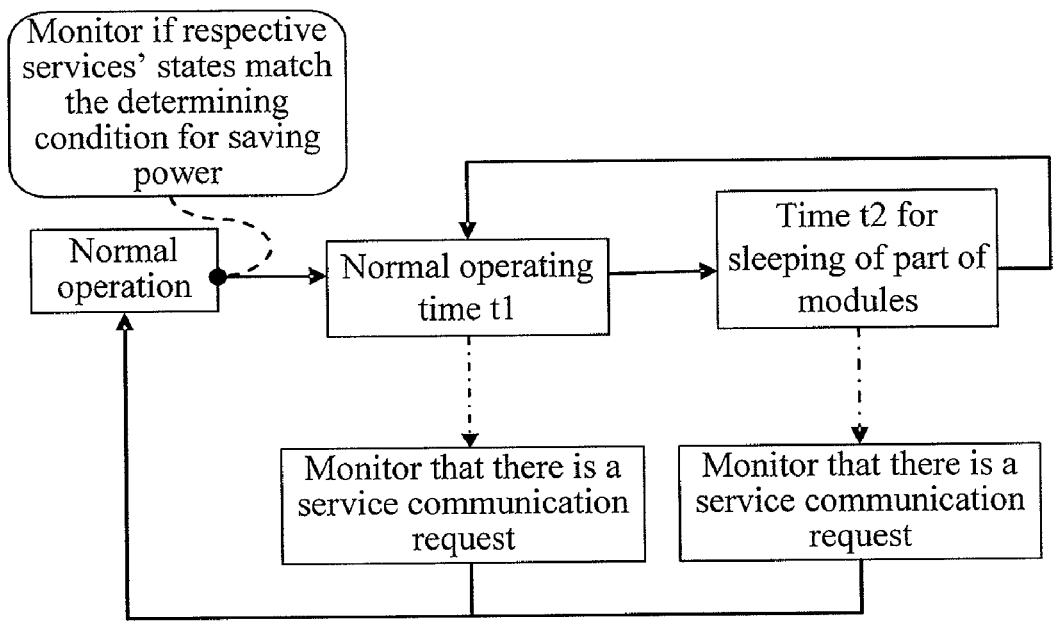
FIG. 5 is a flowchart illustrating an operation of a passive optical network user terminal according to an embodiment of the present invention.

The procedure of operating a passive optical network user terminal is illustrated in FIG. 5.

In FIG. 5, the passive optical network user terminal in the saving state, on one hand, detects states of respective service modules continuously, and quits the saving state and resumes a normal working state once a determining condition for saving is not matched; on the other hand, the passive optical network user terminal during the saving state time period receives various messages or data packets from the office-end OLT, and quits the saving state immediately and resumes the normal working state once receiving a message for instructing to quit the saving state from the office-end OLT. The passive optical network user terminal in the saving state receives service data packets from an external network, performs determination in accordance with protocols, and quits the saving state immediately and resumes the normal operation if it is necessary to quit the saving state.

If the passive optical network user terminal in the saving state is to quit the saving state, it sends a request message for quitting the saving state to the office-end OLT, requesting to resume the bandwidth in the normal operation. The office-end OLT receives the request message for entering into the saving state or the request message for quitting the saving state from the passive optical network user terminal, process the message, and sends a response message to the passive optical network user terminal.

To ensure that some services can be in an active state normally via low-speed data connection, the passive optical network user terminal in the saving state wakes up at a time interval automatically (which is implemented by a timer), wakes up relevant modules in a sleep state (including the optical module and the PON protocol processing module), receives messages and data messages from the office-end OLT, and processes them. A procedure of processing the data messages may include: sending out the data messages from a local port. Then, the passive optical network user terminal enters into the sleep state again, or the passive optical network user terminal quits the saving state and resumes the normal operating state in accordance with requirements of the office-end OLT or requirements of other protocol messages (e.g. NGN voice signaling such as MGCP and SIP).

The difference between the saving state and the normal operating state for a passive optical network user terminal lies in that: in the saving state, the passive optical network user terminal may transmit upstream data and downstream data during the time period t1 in FIG. 4. The working state of the passive optical network user terminal during the time period t2 in FIG. 4 includes the following two solutions. The passive optical network user terminal implements either of the solutions selectively, and reports to the office-end OLT device.

Solution 1: During the time period t2, the optical module and the PON protocol processing module are closed, i.e. modules except the power and clock modules are closed. In this manner, upstream and downstream data can not be transmitted during the time period t2. An advantage of this solution is that power consumption of the optical module and the PON protocol processing module is saved during the time period t2.

Solution 2: During the time period t2, the optical module is not closed, the PON protocol processing module is closed partly, the power and clock modules are not closed, and other modules are closed. In this manner, downstream data messages can be received from the office-end OLT during the time period t2. The office-end OLT sets a DBA policy in accordance with the request for saving from the passive optical network user terminal, so that the office-end OLT does not send a time window authorization to the passive optical network user terminal during the time period t2 and the passive optical network user terminal can not send upstream data messages to the office-end OLT during the time period t2.

An advantage of solution 2 is that the passive optical network user terminal can receive downstream messages from the OLT at any time. Therefore, external calls (e.g. VoIP telephone call) at any time can be responded in time.

In the above embodiment, the passive optical network user terminal sends a request message for entering into the saving state to the office-end OLT before entering into the saving state. As an embodiment, the request message for entering into the saving state may include self identification information, device version information, and may further include values of t1 and t2 and bandwidth information applying for low-speed connection, e.g. 100 kps low-speed connection bandwidth.

The office-end OLT may send a message for requesting the passive optical network user terminal to quit the saving state. In accordance with the message, the passive optical network user terminal attached with a telephone can obtain a great advantage when there is a phone call from external network. The office-end OLT may notify the passive optical network user terminal to quit the saving state through the message, so that the passive optical network user terminal is woken up in time. Alternatively, the OLT may forward a voice signaling message to the passive optical network user terminal, and the passive optical network user terminal quits the saving state on its own in accordance with signaling requirements during a procedure of processing the message.

The values of t1 and t2 in FIG. 4 are reported to the office-end OLT by the passive optical network user terminal, and the office-end OLT sets the DBA policy in accordance with this parameter, so that the authorized window allocated to the passive optical network user terminal coincides with the time period t1 substantively. In this manner, even if the passive optical network user terminal closes the optical module during the time period t2, upstream messages can still be sent to the office-end OLT in the authorized window.

In PON system, if the user does not active any service (e.g. surfing Internet, downloading and ordering, and calling), the passive optical network user terminal device only needs very small bandwidth to maintain a low-speed connection with external devices (e.g. the bandwidth is less than 100 Kbps for periodical handshaking messages between the VoIP module and the central switch and serial information on reading water, electricity and gas meters). Therefore, part of modules in the passive optical network user terminal keep in the sleep state for a long time, and t1 is much smaller than t2. If t1 is a milli of t2, the passive optical network user terminal can obtain at most 1 Mbps bandwidth calculated with the EPON standard, and at most 2.5 Mbps bandwidth calculated with the GPON standard. However, the total energy consumption is approximately equivalent to 0.1% of energy consumption of all the modules in the normal working state (the t1 time period for the normal working state may be omitted relative to the total time). Therefore, the effect of saving energy consumption is remarkable.

The t1 and t2 may be implemented by interrupt of a timer (most of CPUs has a timer internally, which can generate an internal interrupt to notify the CPUs of processing). The operation of the passive optical network user terminal capable of entering into a saving state may include the processes as follows. At the beginning of the saving state, a timer t1 and a timer t2 are first cleared, and then the t1 timer first operates, so that the passive optical network user terminal device continues to operate normally for the time t1. At the expiration of operation for the time t1, the timer t1 is interrupted, and the timer t2 is triggered to operate. At the same time, a part of the modules are controlled to enter into the sleep state via control switches of the modules. At the expiration of operation for the time t2, the timer t2 is interrupted, and the timer t1 is triggered to operate. At the same time, the CPU and relevant modules are woken up to enter into the normal working state via an interrupt of the timer t2. The passive optical network user terminal repeats the two procedures periodically until the supervision thread discovers a service request (e.g. whether the user performs off-hook, user Fast Ethernet port's link status is up or there comes data packets) in the respective modules via the control bus. The passive optical network user terminal suspends the timer t1 or the timer t2, and enters into the normal working state to process user services, until it detects again that the state of itself matches the determining condition for entering into a saving state. At this time, the passive optical network user terminal enters again into the saving state with low-speed connection. The timer t1 and timer t2 continue to operate in the manner as illustrated in FIG. 5 after being cleared.

The passive optical network user terminal according to the present invention is provided with a detection and determination module, a communication module, and a control module.

The detection and determination module is configured to detect the state of the passive optical network user terminal, and to determine whether the detected state matches a determining condition for entering into a saving state, and to notify the communication module if the detection and determination module determines that the detected state matches the determining condition; when the passive optical network user terminal is in a saving state, the detection and determination module continues to detect the state of the passive optical network user terminal, and notifies the communication module if the detection and determination module detects that the state of itself does not match the determining condition for saving. The procedure of detecting the state of the passive optical network user terminal by the detection and determination module, determining condition for entering into a saving state and determining condition for saving are as described in the above method embodiments.

The communication module is configured for communication between an optical line terminal and passive optical network terminals. The communication module, on receiving a notification of matching the determining condition for entering into a saving state, sends a request for entering into a saving state to the optical line terminal. On receiving a notification of not matching the determining condition for saving, the communication module sends a request message for quitting the saving state to the optical line terminal. Parameters carried in the request for entering into a saving state and in the request message for quitting the saving state are as described in the above method embodiments.

The control module is configured, after the passive optical network user terminal receives a response accepting the request for entering into a saving state from the optical line terminal, to control part of modules in the passive optical network user terminal to enter into the saving state, e.g. control corresponding modules to enter into the saving state by using the self-saving function of the modules in the passive optical network user terminal, further e.g. control corresponding modules to enter into the saving state by controlling the opening and closing of power switches of relevant modules in the passive optical network user terminal. After the passive optical network user terminal receives a response rejecting the request for entering into a saving state from the optical line terminal, the control module controls the passive optical network user terminal not to enter into the saving state, and the passive optical network user terminal continues to operate normally. After the passive optical network user terminal receives from the optical line terminal a response accepting the request for quitting the saving state or a message indicating that the OLT explicitly instructs the passive optical network user terminal to quit the saving state, the control module controls corresponding modules to quit the saving state. The procedure is as described in the above method embodiments.

Future optical access network bears various services such as data, voice, video and TV, and can even bear additional services such as pickproof, and water, electricity and gas meters reading. It is possible that ONU terminals as a user terminal of optical fiber access network shall operate continuously for 24 hours. In consideration of communications in the case of emergency, the passive optical network user terminals may be provided with backup batteries. In this case, the saving design of the passive optical network user terminal is very important.

Because during most of operating time of the ONU user terminals (e.g. at night), various services (surfing Internet, phone call, and IP television) are in an inactive state, energy wasting and heat emission are brought about. According to the present invention, a saving state is configured for the passive optical network user terminals, which can save energy consumption and reduce the pressure of heat designing of the ONU terminals while low-speed services are maintained.

For those skilled in the art, there are various modified solutions to implement the present invention without departing from the spirit and scope of the invention. The above description is for preferred embodiments of the present invention, which shall not limit the protective scope of the present invention. Equivalent variations of the description and attached drawings shall be deemed to fall into the protective scope of the present invention.

What is claimed is:

1. A method for operating a passive optical network user terminal, comprising:
   configuring a determining condition for entering into a saving state for the passive optical network user terminal; wherein the determining condition for entering into a saving state is a traffic threshold or an activity indication of a service port;
   detecting if the state of the passive optical network user terminal matches the determining condition for entering into a saving state, and sending a request for entering into a saving state to an optical line terminal if the determining condition is matched, by the passive optical network user terminal; wherein the request message includes saving state parameters; wherein the saving state parameters comprise a saving state operating time and a normal state operating time; and
   after receiving a response accepting the request from the optical line terminal, controlling part of internal modules to enter into a saving state and switching between the saving state and a normal state intermittently, by the passive optical network user terminal.

2. The method of claim 1, wherein
the detecting the determining condition is matched comprises:
   detecting the service traffic periodically, and performing determination of entering into a saving state in accordance with the traffic threshold and the detected service traffic, by the passive optical network user terminal; or
   performing interrupt triggering in accordance with the activity indication of service port of a passive optical network, by the passive optical network user terminal.

3. The method of claim 1, wherein the passive optical network user terminal sends a request message for entering into a save state to the optical line terminal, the request message including saving state parameters; the optical line terminal sets a dynamic bandwidth allocation policy for the passive optical network user terminal in accordance with the saving state parameters if the optical line terminal accepts the request, so that an authorized time window allocated to the passive optical network user terminal is in a normal state time period; the passive optical network user terminal does not enter into the saving state if the optical line terminal does not accept the request or does not respond to the request.

4. The method of claim 3, wherein the saving state parameters comprise a saving state operating time and a normal state operating time, the passive optical network user terminal wakes up and sleeps periodically in accordance with the operating time; in the normal state the passive optical network user terminal operates normally, and data with low-speed service connection is transmitted between the passive optical network user terminal and the optical line terminal; in a sleep state the power consumption of a part of modules of the passive optical network user terminal is stopped or reduced, and sends no data to the optical line terminal.

5. The method of claim 1, wherein a low-power consumption mode of a central processing module in the passive optical network user terminal is utilized to make the central processing module enter into a part-sleep state.

6. The method of claim 1, wherein a self-saving function of the modules in the passive optical network user terminal is utilized to make the modules enter into a saving state; or relevant modules in the passive optical network user terminal are provided with a power switch respectively, so that the central processing module in the passive optical network user terminal controls corresponding modules to switch between the normal state and the saving state by the closing and opening of the power switches.

7. The method of claim 6, wherein an optical module and a passive optical network protocol processing module are controlled to be in a saving state, so that the passive optical network user terminal in the saving state is not able to transmit upstream and downstream data, to save power consumption of the optical module and the passive optical network protocol processing module; or the optical module and part of the passive optical network protocol processing module are controlled to be in a saving state, so that the passive optical network user terminal in the saving state can receive downstream data messages from the optical line terminal.

8. The method of claim 1, wherein the passive optical network user terminal in the saving state detects the state of the passive optical network user terminal; if the passive optical network user terminal detects that the state of the passive optical network user terminal does not match the determining condition for saving power, the passive optical network user terminal quits the saving state and resumes a normal working state.

9. The method of claim 1, wherein the passive optical network user terminal in the saving state receives information from the optical line terminal; if the passive optical network user terminal receives information for instructing to quit the saving state, the passive optical network user terminal quits the saving state and resumes a normal working state.

10. The method of claim 1, wherein if the passive optical network user terminal in the saving state is to quit the saving state, the passive optical network user terminal sends a request message for quitting the saving state to the optical line terminal, to request a bandwidth for resumed normal operation.

11. A system for a passive optical network, comprising: a passive optical network user terminal of claim 1 and an optical line terminal;
   the passive optical network user terminal, configured to detect the state of the passive optical network user terminal, and determine whether the detected state matches a determining condition for entering into a saving state, wherein the determining condition for entering into a saving state is a traffic threshold or an activity indication of a service port; and send a request for entering into a saving state to an optical line terminal if the detected state matches the determining condition; wherein the request message includes saving state parameters; wherein the saving state parameters comprise a saving state operating time and a normal state operating time; and control part of modules in the passive optical network user terminal to enter into the saving state after receiving a response accepting the request from the optical line terminal;
   the optical line terminal, configured to set a dynamic bandwidth allocation policy for the passive optical network user terminal in accordance with the saving state parameters if the optical line terminal accepts the request, so that an authorized time window allocated to the passive optical network user terminal is in a normal state time period; and send a response to the passive optical network user terminal if the optical line terminal accepts the request.

12. A passive optical network user terminal device, wherein the passive optical network user terminal device is provided with a detection and determination module, a communication module, and a control module;
   the detection and determination module is configured to detect the state of the passive optical network user terminal, and to determine whether the detected state matches a determining condition for entering into a saving state, wherein the determining condition for entering into a saving state is a traffic threshold or an activity indication of a service port; and to notify the communication module if the detection and determination module determines that the detected state matches the determining condition;
   the communication module is configured to send a request for entering into a saving state to an optical line terminal upon being notified; wherein the request message includes saving state parameters; wherein the saving state parameters comprise a saving state operating time and a normal state operating time; and
   the control module is configured to control part of modules in the passive optical network user terminal to enter into the saving state after the passive optical network user terminal receives a response accepting the request from the optical line terminal.

* * * * *